US011501676B2

United States Patent
Kwon et al.

(10) Patent No.: US 11,501,676 B2
(45) Date of Patent: Nov. 15, 2022

(54) DISPLAY DEVICE AND OPERATING METHOD THEREFOR

(71) Applicant: LG ELECTRONICS INC., Seoul (KR)

(72) Inventors: Jeonghwan Kwon, Seoul (KR); Eunjung Lee, Seoul (KR); Jinseong Kim, Seoul (KR); Kyungnam Bae, Seoul (KR); Byounghyun Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 17/008,261

(22) Filed: Aug. 31, 2020

(65) Prior Publication Data
US 2021/0327326 A1 Oct. 21, 2021

(30) Foreign Application Priority Data
Apr. 21, 2020 (KR) .......................... 10-2020-0048370

(51) Int. Cl.
*G09G 3/20* (2006.01)
*H04N 21/41* (2011.01)
*H04N 21/422* (2011.01)

(52) U.S. Cl.
CPC .......... *G09G 3/20* (2013.01); *H04N 21/41265* (2020.08); *H04N 21/42208* (2013.01); *G09G 2354/00* (2013.01); *G09G 2370/06* (2013.01); *G09G 2370/16* (2013.01)

(58) Field of Classification Search
CPC .............................................. H04N 21/41208
USPC .......................................................... 345/520
See application file for complete search history.

(56) References Cited

U.S. PATENT DOCUMENTS

| 5,091,866 A | * | 2/1992 | Takagi | ..................... G09G 5/08 715/803 |
| 9,807,446 B2 | * | 10/2017 | Sirpal | ................... H04N 21/422 |
| 2010/0180304 A1 | * | 7/2010 | Hassell | ............ H04N 21/47214 725/44 |
| 2013/0088332 A1 | * | 4/2013 | Park | .................... H04N 21/4131 340/10.1 |
| 2013/0171981 A1 | * | 7/2013 | Woo | ....................... G08C 17/02 455/420 |

(Continued)

OTHER PUBLICATIONS

European Patent Office Application Serial No. 20192546.8, Search Report dated Feb. 9, 2021, 9 pages.

(Continued)

*Primary Examiner* — Javid A Amini
(74) *Attorney, Agent, or Firm* — Lee, Hong, Degerman, Kang & Waimey PC

(57) ABSTRACT

Provided are a display device and an operating method therefor. The display device include a user input interface configured to receive a signal from a remote control device, a wireless communication interface configured to receive image data from an external device and control data of the external device, a display configured to output a screen of the external device by using the received image data, and a controller configured to control the display to change a pointer display mode of the remote control device based on the control data of the external device received while outputting the screen of the external device.

18 Claims, 12 Drawing Sheets

(56) References Cited

U.S. PATENT DOCUMENTS

| | | | | |
|---|---|---|---|---|
| 2014/0325560 | A1* | 10/2014 | Kim | G06F 9/4401 |
| | | | | 725/110 |
| 2015/0172767 | A1* | 6/2015 | Park | H04N 21/41265 |
| | | | | 725/41 |
| 2015/0301777 | A1* | 10/2015 | Jang | H04N 21/41265 |
| | | | | 345/169 |
| 2015/0325118 | A1* | 11/2015 | Yu | H04N 21/41265 |
| | | | | 398/106 |
| 2017/0272681 | A1* | 9/2017 | Oh | H04N 21/443 |
| 2018/0115610 | A1* | 4/2018 | VanWart | H04L 43/08 |
| 2018/0217719 | A1* | 8/2018 | Streit | H04N 21/4222 |

OTHER PUBLICATIONS

Wi-Fi Alliance, "Wi-Fi Display Technical Specification v2.1," 2017, 196 pages.

* cited by examiner

Content-Type: text/parameters^M CSeq: 5^M ^M wfd_uibc_setting: enable^M
Content-Type: text/parameters^M CSeq: 6^M ^M wfd_uibc_setting: disable^M

DISPLAY DEVICE AND OPERATING METHOD THEREFOR

CROSS-REFERENCE TO RELATED APPLICATIONS

Pursuant to 35 U.S.C. § 119(a), this application claims the benefit of earlier filing date and right of priority to Korean Patent Application No. 10-2020-0048370, filed on Apr. 21, 2020, the contents of which are all hereby incorporated by reference herein in its entirety.

BACKGROUND

The present disclosure relates to a display device and an operating method thereof, and more particularly, to a display device for outputting a screen of an external device, and an operating method thereof.

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

Also, the display device may provide a Miracast function of outputting a screen of an external device as it is. In detail, Miracast is provided for displaying an image displayed on a small screen such as a smartphone, a notebook on a large screen such as a TV. The display device may output the screen of the external device as it is by using data received from the external device.

Meanwhile, the display device may control the external device by transmitting a control signal to the external device while outputting a screen of the external device. Therefore, the user can control the external device connected to the display device through a remote control device (for example, a remote controller) that remotely controls the display device. In this case, when a pointer (for example, a mouse cursor) of an external device and a pointer (for example, a remote control pointer) of a display device are displayed at the same time, the two pointers may not be moved at the same time due to a delay occurring in the process of transmitting or receiving data between the display device and the external device. A user may be confused as to which of the two pointers moving with time difference is manipulated.

SUMMARY

The present disclosure provides a display device capable of controlling an external device while outputting a screen of the external device through the display device, and an operating method therefor.

The present disclosure provides a display device operating in a mode that minimizes a problem caused by a time difference occurring in a data transmission or reception process when controlling an external device while outputting a screen of the external device, and an operating method therefor.

According to the present disclosure a display device comprising: a user input interface configured to receive a signal from a remote control device; a wireless communication interface configured to receive image data from an external device and control data of the external device; a display configured to output a screen of the external device by using the received image data; and a controller configured to control the display to change a pointer display mode of the remote control device based on the control data of the external device received while outputting the screen of the external device.

wherein the control data includes information for determining whether the external device is able to be controlled by using the remote control device.

wherein the controller is configured to control the display to operate in a mode in which a pointer of the remote control device is transparently displayed when the external device is able be controlled by using the remote control device.

wherein the controller is configured to control the display to operate in a mode in which a pointer of the remote control device is transparently displayed when a cursor of the external device is output on a screen and the external device is able be controlled by using the remote control device.

wherein, when the external device is able to be controlled by using the remote control device, the display is configured to display a shape of a first pointer of the remote control device differently from a shape of a second pointer of the remote control device when the external device is not able to be controlled by using the remote control device.

wherein, when the external device is able to be controlled by using the remote control device, the display is configured to display a first pointer of the remote control device more transparently than a second pointer of the remote control device when the external device is not able to be controlled by using the remote control device.

wherein the controller is configured to control the display such that the pointer display mode of the remote control device is changed according to a position of a pointer of the remote control device.

wherein the controller is configured to control the display to operate in a mode in which the pointer of the remote control device is transparently displayed when the pointer is located on the screen of the external device.

wherein, when the pointer is located on the screen of the external device, the display is configured to display the pointer of the remote control device more transparently than the pointer of the remote control device when the pointer is located outside the screen of the external device.

wherein the display is configured to: display the pointer in a first mode when the pointer is located outside the screen of the external device; display the pointer in a second mode when the pointer is located on the screen of the external device and the external device is able to be controlled by using the pointer; and display the pointer in a third mode when the pointer is located on the screen of the external device and the external device is not able to be controlled by using the pointer.

The details of one or more embodiments are set forth in the accompanying drawings and the description below. Other features will be apparent from the description and drawings, and from the claims.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
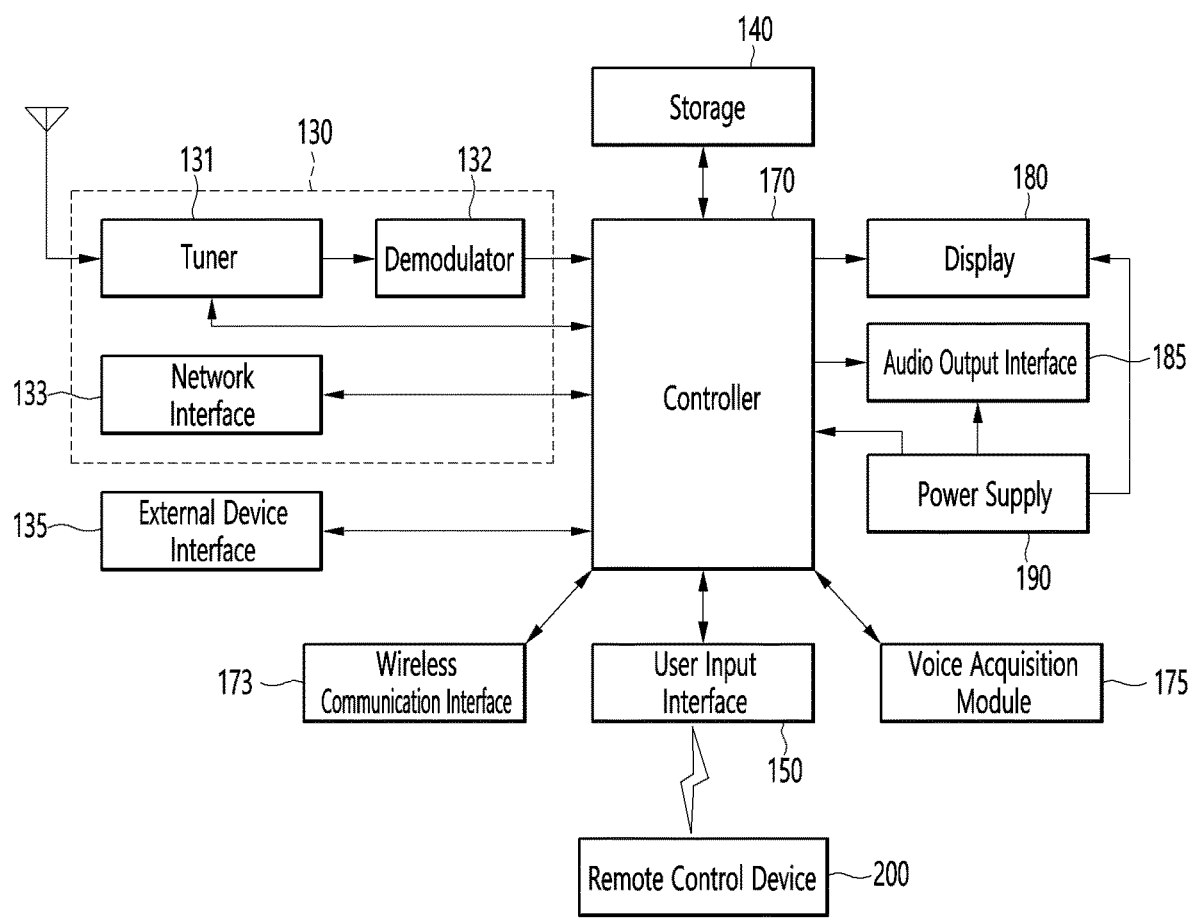
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
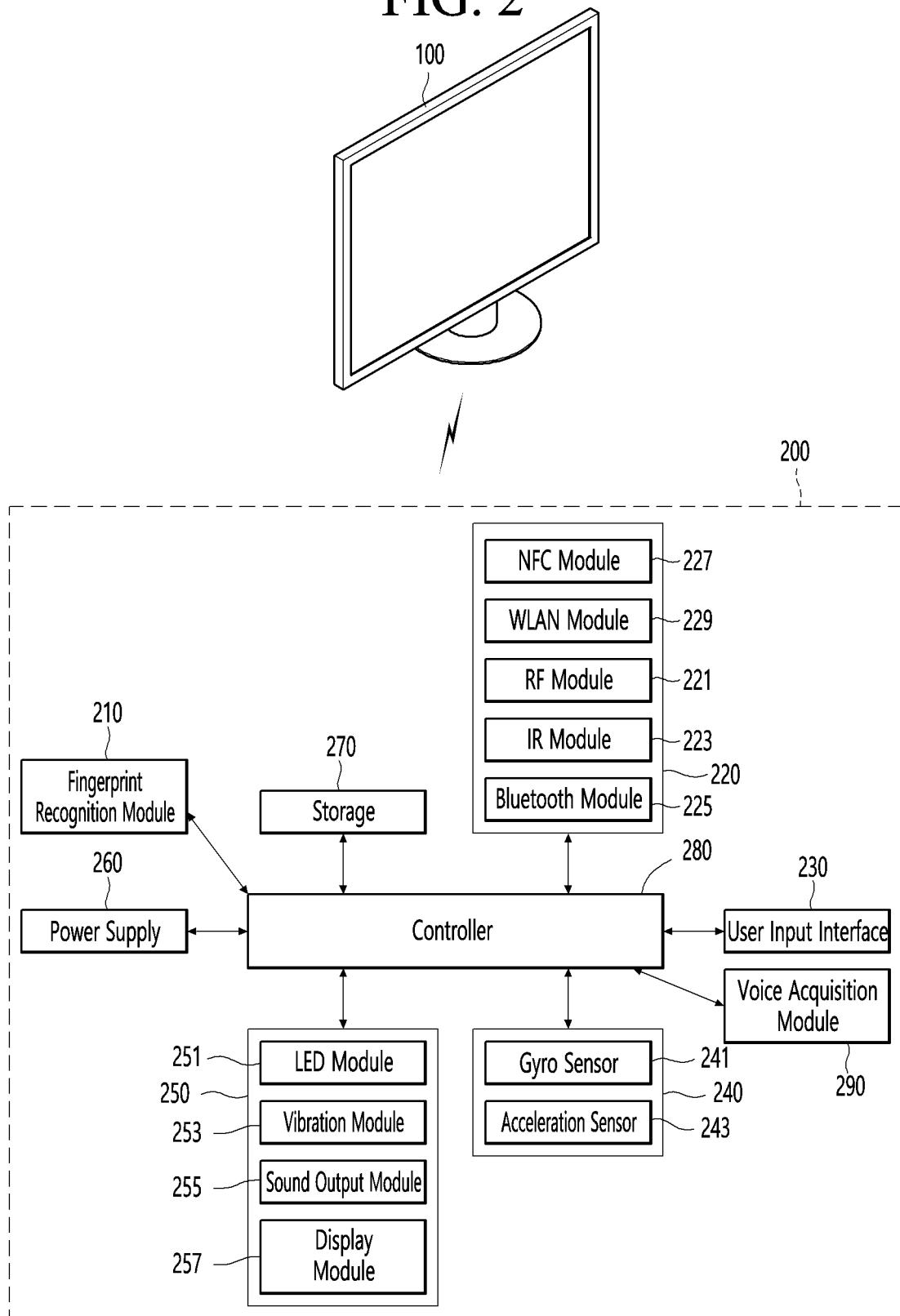
FIG. 2 is a block diagram illustrating a remote control device according to an embodiment of the present disclosure.
Figure 3:
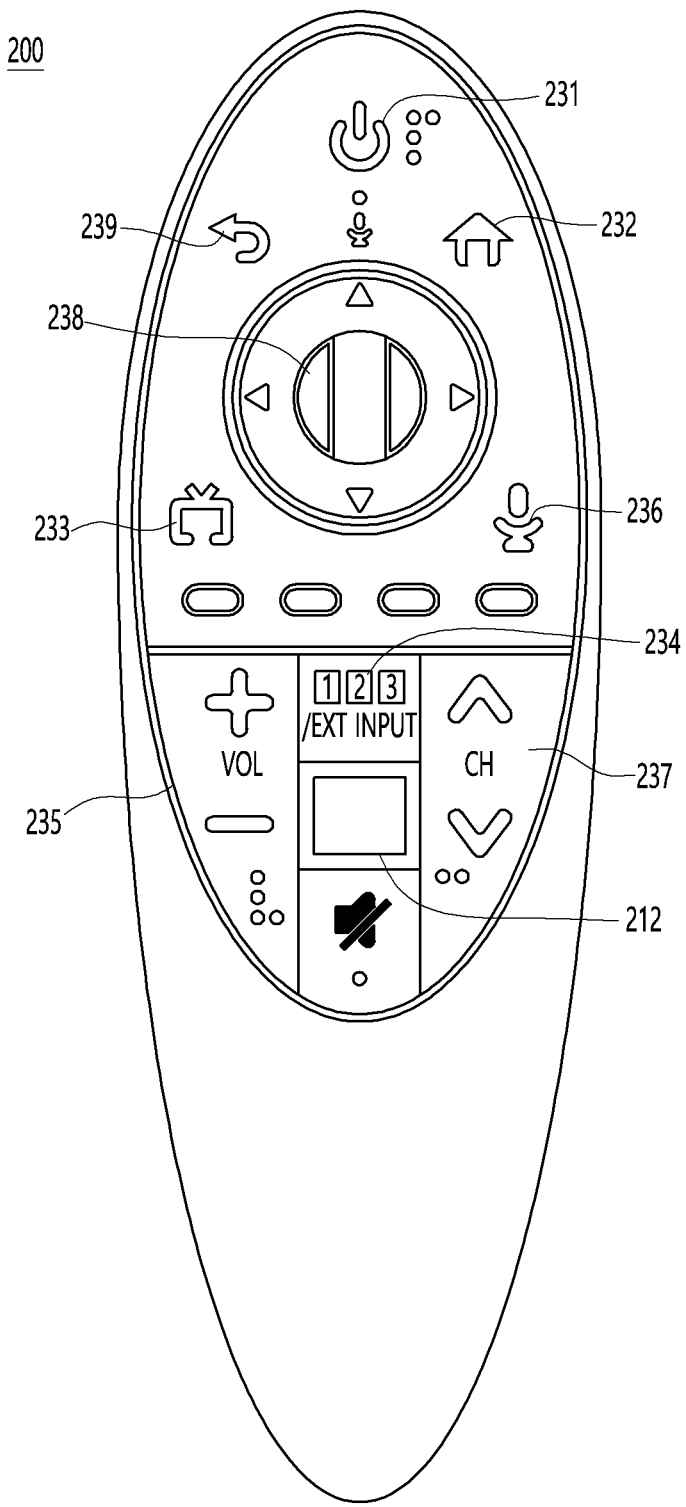
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
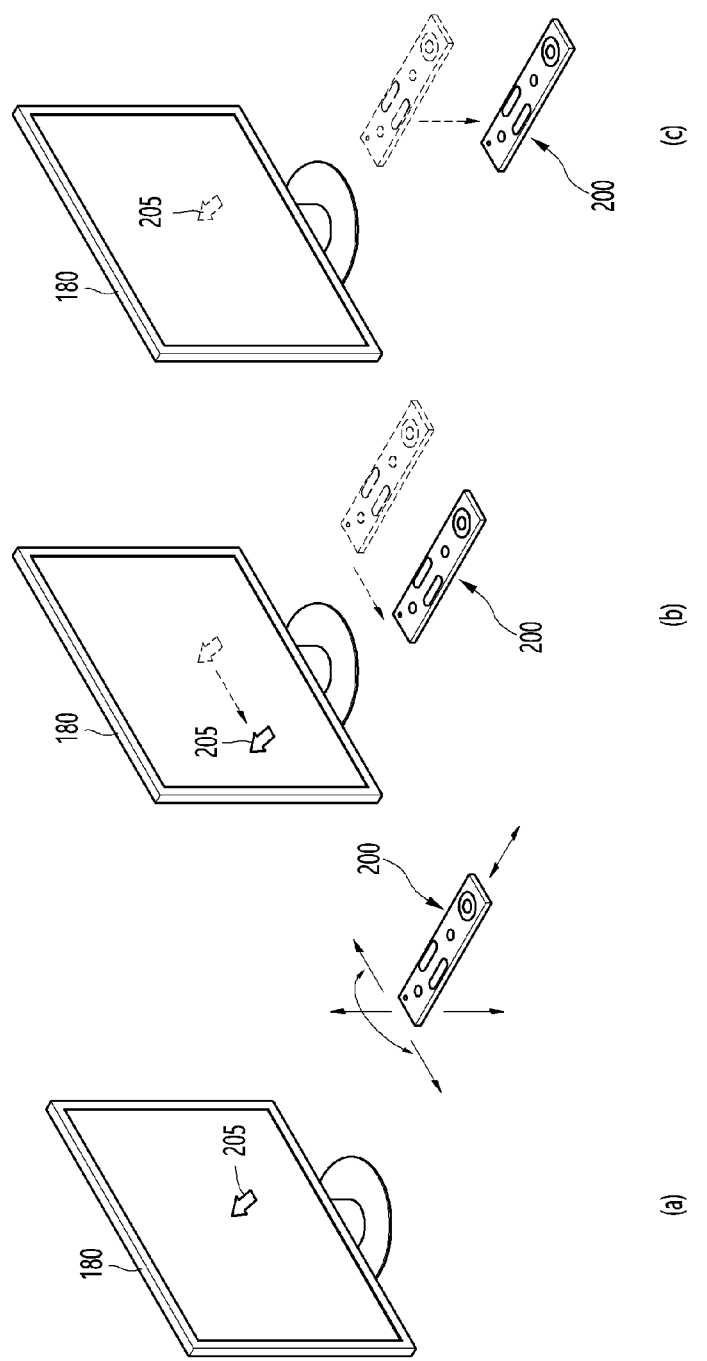
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

The display 180 may display a screen of an external device connected to the display device 100. This function may be referred to as Miracast.

Next, Miracast, which is the function provided by the display device 100 according to the embodiment of the present disclosure, will be described with reference to FIG. 5.

Figure 5:
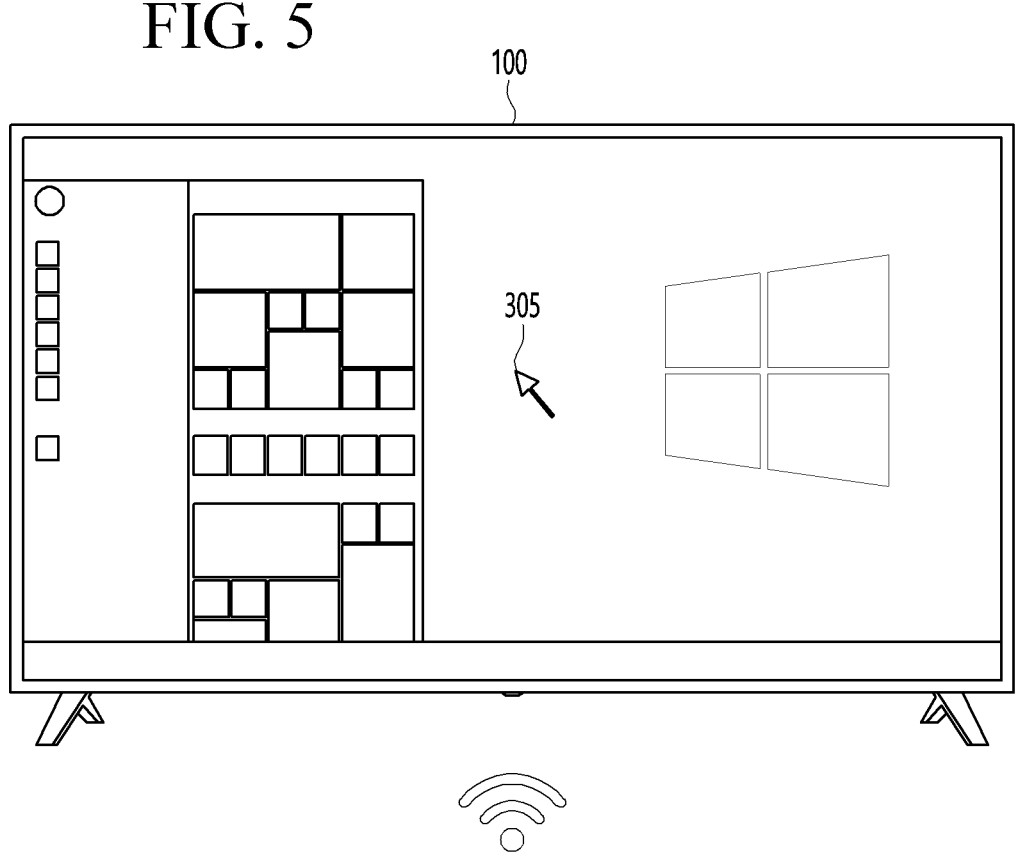
FIG. 5 is a diagram illustrating an example of a screen when the display device according to the embodiment of the present disclosure operates as Miracast.
Figure 5:
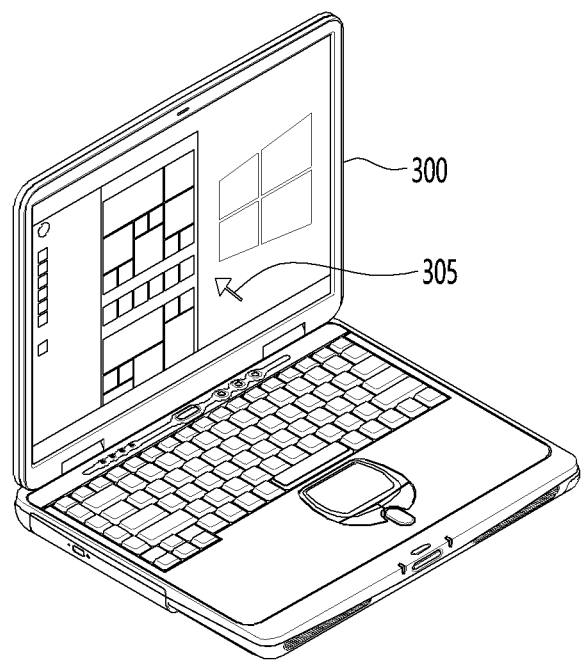

FIG. 5 is a diagram illustrating an example of a screen when the display device according to the embodiment of the present disclosure operates as Miracast.

The display device 100 may be wirelessly connected to an external device 300 to control the display 180 to display the screen of the external device 300.

The external device 300 may include any devices that can be wirelessly connected to the display device 100. For example, the external device 300 may include a smartphone, a notebook, a tablet, and a PC. In the present specification, including FIG. 5, it is assumed that a notebook is connected to the display device 100 as the external device 300, but this is only an example for convenience of description. Various external devices other than the notebook may be connected to the display device 100.

The wireless communication interface 173 of the display device 100 may receive image data from the external device 300. The image data may be data about the screen of the external device 300. The image data may be data that allows the screen of the external device 300 to be output from the display device 100 as it is.

The display 180 may output the screen of the external device 300 by using the image data received from the external device 300. As illustrated in FIG. 5, the display device 100 may display the screen of the external device 300 as it is.

Meanwhile, the display device 100 may transmit a control signal to the external device 300 through the wireless communication interface 173. In this case, the control signal may be a signal for a control command input to the display device 100 through the remote control device 200. Therefore, the control signal may include information about the movement of the remote control device 200. The control signal may be transmitted to the external device 300, and a controller (not illustrated) of the external device 300 may control the external device 300 according to the received control signal.

For example, when the external device 300 is a notebook as illustrated in FIG. 5, a mouse cursor 305 may be displayed on the screen of the external device 300. Therefore, the mouse cursor 305 and the pointer 205 of the remote control device may be displayed together on the display 180 that displays the screen of the external device 300.

In the present specification, for convenience of description, the shape displayed corresponding to the movement of the remote control device 200 that transmits or receives an input command associated with the display device 100 is referred to as the pointer 205 of the remote control device 200 or the pointer 205, and the shape displayed corresponding to the movement of the controller (not illustrated) of the external device 300 that transmits or receives an input command associated with the external device 300 is referred to as the mouse cursor 305. These names do not limit the scope of the present disclosure.

When the pointer 205 displayed on the display 180 is moved by the operation of the user's remote control device 200, the display device 100 may transmit a control signal including movement information about the remote control device 200 to the external device 300 through the wireless communication interface 173. The external device 300 may control the mouse cursor 305 to be moved according to the movement information about the remote control device 200 through the received control signal. The external device 300 may transmit, to the display device 100, image data displayed by moving the mouse cursor 305, and the display device 100 may control the display 180 to display the screen of the external device 300 through the received image data.

In this manner, the user may view the screen of the external device 300 on a large screen and may control the external device 300 by using the remote control device 200 of the display device 100.

However, delay may occur in a process in which the display device 100 and the external device 300 wirelessly transmit or receive control signals and image data to each other. That is, it may take a certain time for the user to move the pointer 205 of the remote control device and to move the mouse cursor 305 displayed on the screen according to the user's movement. Therefore, when the user moves the pointer 205 and the mouse cursor 305 moves after a certain time, it may be difficult for the user to recognize which of the pointer 205 and the mouse cursor 305 is being operated. This may be confusing for the user.

In order to solve these problems, the display device 100 according to the embodiment of the present disclosure may change the display mode of the pointer 205 of the remote control device 200 based on the received control data of the external device 300 while outputting the screen of the external device 300.

According to an embodiment, when it is determined that the external device 300 can be controlled by using the remote control device 200 based on the control data, the display device 100 may operate in a mode in which the pointer 205 of the remote control device 200 is transparently displayed.

The control data may refer to data transmitted or received between the display device 100 and the external device 300 in association with wireless control. For example, the control data may include User Input Back Channel (UIBC) parameters, Real-Time Streaming Protocol (RTSP) parameters, and information about the movement of the remote control device 200, and the like. The control data exchanged between the display device 100 and the external device 300 may include communication data according to the Wi-Fi Display (WFD) standard.

However, since the control data exchanged during the Miracast connection between the display device 100 and the external device 300 does not include information about whether the external device 300 outputs the mouse cursor 305 on the screen, the display device 100 has difficulty in determining whether to change the display mode of the pointer 205.

For example, when the external device 300 is a smartphone, the mouse cursor 305 is not displayed on a screen of the smartphone, but when the control data does not include such information, the display device 100 may have difficulty in determining whether the pointer 205 does not need to be displayed.

Therefore, the display device 100 according to the embodiment of the present disclosure may determine whether the external device 300 displays the mouse cursor 305 through the RTSP parameters included in the control data received from the external device 300.

For example, when the RTSP parameters received from the external device 300 include 'Microsoft_rtsp_capability', the display device 100 may determine that the external device 300 is an external device 300 operating with 'Windows 10', which is an operating system supported by 'Microsoft'. In this case, since the external device 300 can be a PC or a notebook, the display device 100 may determine that the mouse cursor 305 is displayed on the screen of the external device 300 and may display the pointer 205 transparently. This is only an example, and the display device 100 according to the embodiment of the present disclosure may receive, from the external device 300, information about whether the external device 300 displays the mouse cursor 305 on the screen.

Hereinafter, in the present specification, it is assumed that the external device 300 is a device on which the mouse cursor 305 is displayed, like a PC or a notebook.

Next, a method in which the display device 100 according to the embodiment of the present disclosure changes the display mode of the pointer 205 based on the control data of the external device 300 will be described with reference to FIG. 6.

Figures 6, 7:
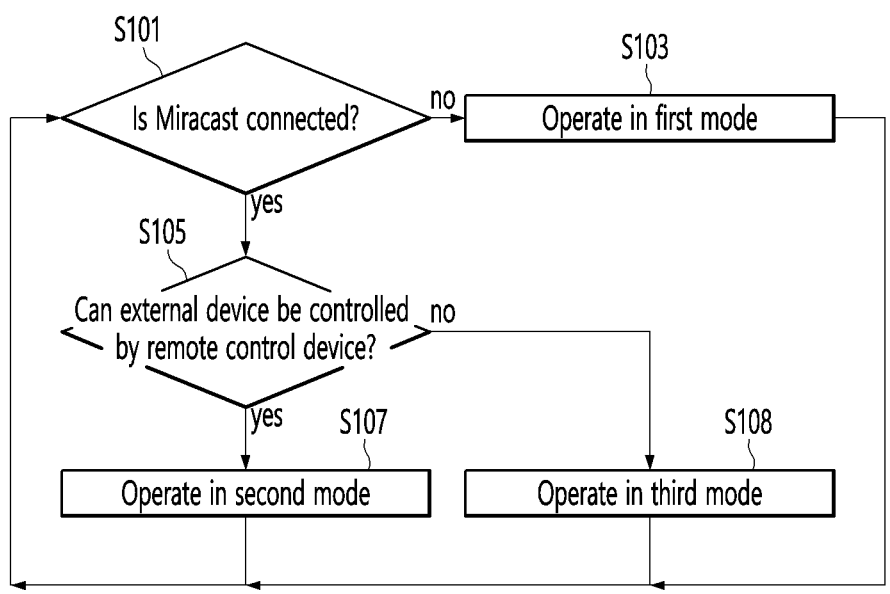
FIG. 6 is a flowchart for describing an operating method of a display device, according to an embodiment of the present disclosure.
FIG. 7 is an exemplary view illustrating part of control data exchanged between a display device and an external device.

FIG. 6 is a flowchart for describing an operating method of the display device, according to an embodiment of the present disclosure.

The controller 170 may determine whether Miracast is connected (S101). Whether the Miracast is connected may be checked through the wireless communication interface 173.

When the Miracast is not connected, the controller 170 may control the display 180 to operate in a first mode (S103).

The first mode may be a mode in which the pointer 205 of the remote control device 200 is displayed such that the user can easily recognize the pointer 205 of the remote control device 200. The transparency of the pointer 205 in the first mode may be lower than the transparency of the pointer 205 in a second mode and the transparency of the pointer 205 in a third mode, which will be described below.

The first mode may be a mode in which the pointer 205 of the remote control device 200 is opaquely displayed on the display 180. The method for displaying the pointer 205 of the remote control device 200 on the screen in the first mode may be a method in which the display device 100 displays the pointer 205 only when there is a user input. For example, the first mode may refer to a mode in which the pointer 205 is displayed on the display 180 when the user operates the user input interface 230 of the remote control device 200 so as to use the remote control device 200. That is, if there is no input from the remote control device 200 when the display device 100 is displaying a broadcast screen, the display device 100 may not display the pointer 205 and may display the pointer 205 until the control signal is input from the user input interface 230 or a few seconds elapse after the input of the control signal.

Next, when the Miracast is connected, the controller 170 may determine whether the external device 300 can be controlled by the remote control device 200 (S105).

Whether the external device 300 can be controlled by the remote control device 200 may be changed according to whether the external device 300 allows the display device 100 to control the external device 300. The controller 170 may determine whether the external device 300 can be controlled by using the remote control device 200 through the control data of the external device 300 received from the wireless communication interface 173.

When the controller 170 receives the control data indicating that the external device 300 is set to use the UIBC, the controller 170 may determine that the external device 300 can be controlled by the remote control device 200. The external device 300 is set to use the UIBC because the display device 100 and the external device 300 can transmit or receive data packets including the control data through the UIBC and thus the display device 100 can wirelessly control the external device 300.

In contrast, when the control data indicating that the external device 300 is set not to use the UIBC is received, the controller 170 may determine that the external device 300 cannot be controlled by the remote control device 200.

Next, a method in which the controller 170 determines whether the external device 300 can be controlled by the remote control device 200 through the control data will be described with reference to FIG. 7.

FIG. 7 is an exemplary view illustrating part of control data exchanged between the display device and the external device.

The controller 170 may determine whether to use the UIBC through the setting value of 'wfd_uibc_setting' among the control data received from the external device 300.

For example, when the setting value of 'wfd_uibc_setting' is 'enable', the controller 170 may determine that the UIBC is used. That is, when the setting value of 'wfd_uibc_setting' is 'enable', the controller 170 may determine that the external device 300 can be controlled through the remote control device 200.

As another example, when the setting value of 'wfd_uibc_setting' is 'disable', the controller 170 may determine that the UIBC is not used. That is, when the setting value of 'wfd_uibc_setting' is 'disable', the controller 170 may determine that the external device 300 cannot be controlled through the remote control device 200.

That is, when the UIBC setting value of the control data received from the external device 300 is 'enable', the controller 170 may determine that the external device 300 can be controlled by using the UIBC, and when the UIBC setting value of the control data received from the external device 300 is 'disable', the controller 170 may determine that the external device 300 cannot be controlled by using the UIBC.

Referring back to FIG. 6, when it is determined that the external device 300 can be controlled by the remote control device 200, the controller 170 may operate in the second mode (S107).

The second mode may be a mode in which the pointer 205 is displayed to minimize user inconvenience due to simultaneous display of the pointer 205 of the remote control device 200 and the cursor 305 of the external device 300. The transparency of the pointer 205 in the second mode may be higher than the transparency of the pointer 205 in the first mode and the transparency of the pointer 205 in the third mode.

When it is determined that the external device 300 can be controlled by the remote control device 200 according to whether the external device 300 uses the UIBC, the controller 170 may control the display device 100 to operate in the second mode.

Next, a method in which the display device 100 according to the embodiment of the present disclosure operates in a second mode will be described with reference to FIG. 8.

Figure 8:
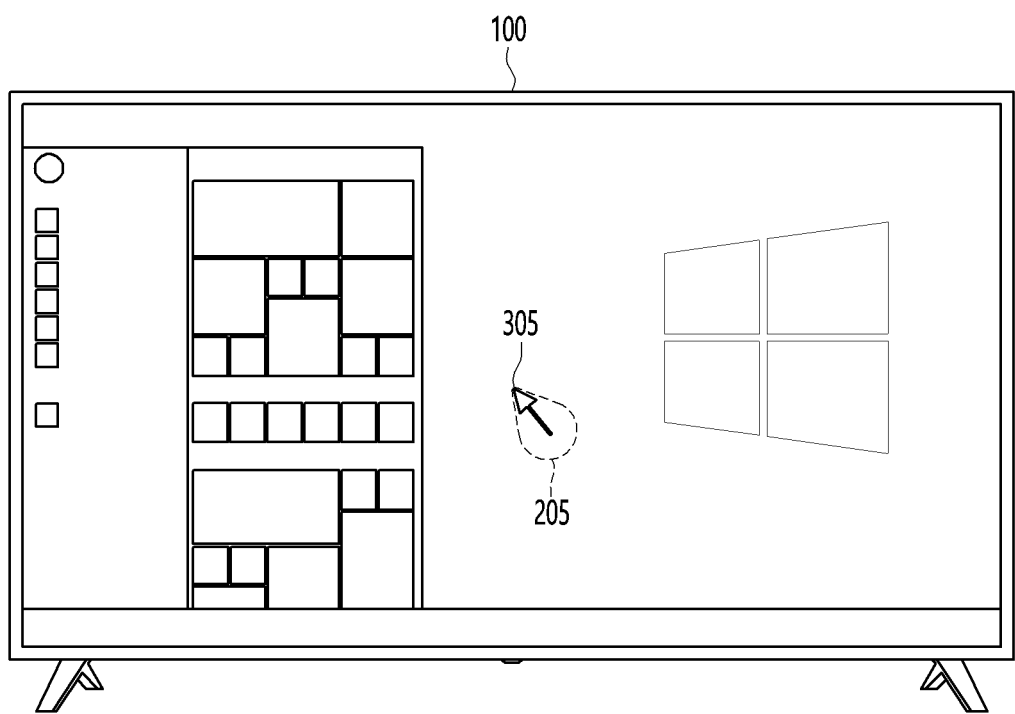
FIG. 8 is an exemplary view illustrating an operating method of a display device when an external device can be controlled by using a remote control device, according to an embodiment of the present disclosure.

FIG. 8 is an exemplary view illustrating the operating method of the display device when the external device can be controlled by the remote control device, according to an embodiment of the present disclosure.

The second mode may refer to a mode in which the pointer 205 of the remote control device 200 is not displayed on the screen when the external device 300 can be controlled through the remote control device 200 of the display device 100. That is, the second mode may be a mode in which the pointer 205 of the remote control device 200 is transparently displayed.

The second mode may be a mode in which when the mouse cursor 305 of the external device 300 and the pointer 205 of the remote control device 200 are simultaneously displayed on the screen, the pointer 205 is not displayed on the screen so as to prevent the user from being confused by the time difference movement of the mouse cursor 305 and the pointer 205.

Therefore, that the display device 100 operates in the second mode may mean that the pointer 205 is displayed on the display 180 in a transparent mode.

According to an embodiment, the controller 170 may control the display 180 so that the pointer 205 is transparently displayed in the second mode.

According to another embodiment, when the external device can be controlled by using the remote control device 200 (in the second mode), the display 180 may the first pointer 205 of the remote control device 200 more transparently than the second pointer 205 of the remote control device when the external device 300 cannot be controlled by using the of the remote control device 200 (in the first mode or the third mode).

According to this embodiment, since only the mouse cursor 305 is displayed on the screen displayed on the display 180, the user can recognize that the mouse cursor 305 is operated by the remote control device 200, thereby minimizing the user's confusion.

Referring back to FIG. 6, when it is determined that the external device 300 cannot be controlled by the remote control device 200, the controller 170 may operate in the third mode (S108).

When it is determined that the external device 300 cannot be controlled by the remote control device 200 because the external device 300 does not use the UIBC, the controller 170 may control the display device 100 to operate in the third mode.

The third mode may be a mode in which the pointer 205 is displayed such that the user can easily recognize a state in which the external device 300 cannot be controlled by the remote control device 200. The transparency of the pointer 205 in the third mode may be lower than the transparency of the pointer 205 in the first mode and the transparency of the pointer 205 in the second mode.

Next, a method in which the display device 100 operates in the third mode will be described with reference to FIG. 9.

Figure 9:
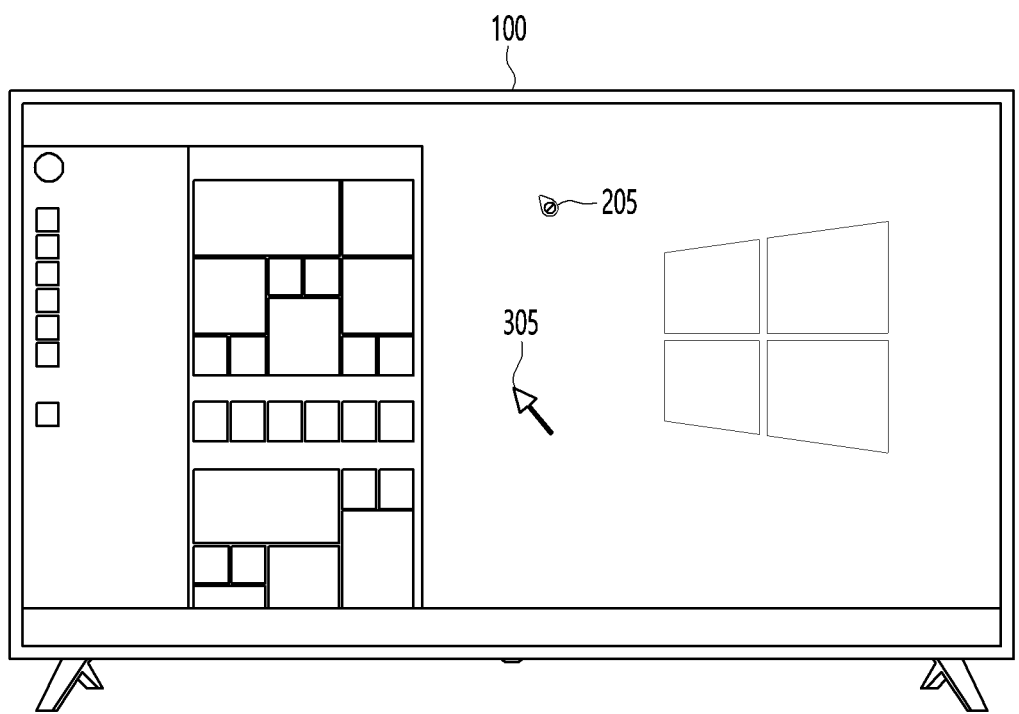
FIG. 9 is an exemplary view illustrating an operating method of a display device when an external device cannot be controlled by using a remote control device, according to an embodiment of the present disclosure.

FIG. 9 is an exemplary view illustrating the operating method of the display device when the external device cannot be controlled by the remote control device, according to an embodiment of the present disclosure.

The third mode may be a mode in which the display 180 changes and displays the shape of the pointer 205 so as to indicate to the user that the external device 300 cannot be controlled by using the pointer 205 of the remote control device 200.

That is, when the external device 300 cannot be controlled by using the remote control device 200 as illustrated in FIG. 9 (in the third mode), the display 180 may display the shape of the first pointer 205 of the remote control device 200 differently from the shape of the second pointer 205 of the remote control device 200 when the external device 300 can be controlled by using the remote control device 200 (in the second mode).

For example, when the external device 300 cannot be controlled (in the third mode), the display 180 may display the pointer 205 by a method of displaying a prohibition icon on the pointer 205 as illustrated in FIG. 205, but this is only an example and the present disclosure is not limited thereto. As another example, when the external device 300 cannot be controlled (in the third mode), the display 180 may display the pointer 205 translucently.

In the third mode, the mouse cursor 305 may not move even if the user moves the pointer 205.

Through this embodiment, when the external device cannot be controlled, the display device 100 changes and displays the shape of the pointer 205, thereby enabling the user to immediately recognize that the external device cannot be controlled.

Meanwhile, when the Miracast is activated, the display device 100 may display the screen of the external device 300 on the display 180 as a full screen or may display the screen of the external device 300 on only part of the display 180.

The display device 100 may display the screen of the external device 300 on part of the display 180 and may display other content on a portion where the screen of the external device 300 is not displayed. In this case, the other content may be a broadcast image, an external input image, an application image, etc. other than the screen of the external device 300.

If the pointer 205 of the remote control device 200 is displayed transparently even when the pointer 205 of the remote control device is located outside the screen of the external device 300 (e.g., a broadcast image), the user may have difficulty in controlling the display device 100.

Therefore, the display device 100 according to the embodiment of the present disclosure may change the operation mode according to the position of the pointer 205 of the remote control device 200.

A method in which the display device 100 according to the embodiment of the present disclosure changes the display mode of the pointer 205 according to the position of the pointer 205 of the remote control device 200 will be described with reference to FIG. 10.

Figure 10:
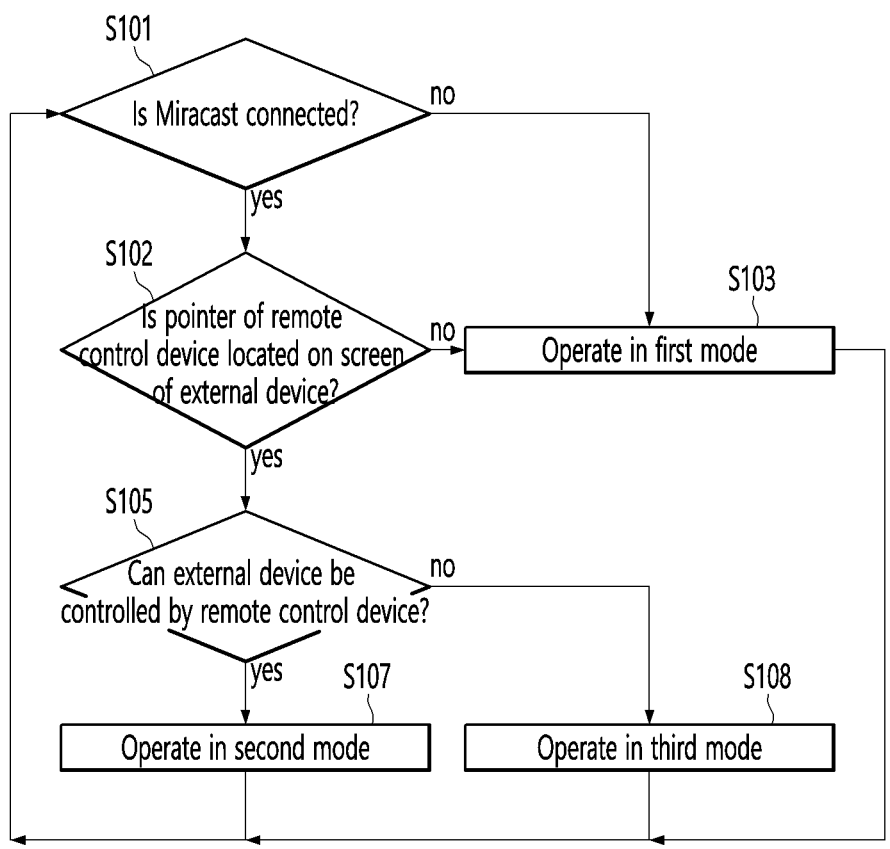
FIG. 10 is a flowchart for describing an operating method of a display device, according to another embodiment of the present disclosure.

FIG. 10 is a flowchart for describing the operating method of the display device, according to another embodiment of the present disclosure.

Since operations S101, S105, S107, and S108 in FIG. 10 are the same as operations S101, S105, S107, and S108 described with reference to FIG. 6, a redundant description thereof will be omitted.

The controller 170 checks whether the Miracast is connected (S101).

When the Miracast is connected, the controller 170 may determine whether the pointer 205 of the remote control device 200 is located on the screen of the external device 300 (S102).

When the pointer 205 of the remote control device 200 is not located on the screen of the external device 300, the controller 170 may operate in the first mode (S103).

Next, the operating method of the display device 100 when the pointer 205 of the remote control device 200 is not located on the screen of the external device 300 will be described with reference to FIG. 11.

Figure 11:
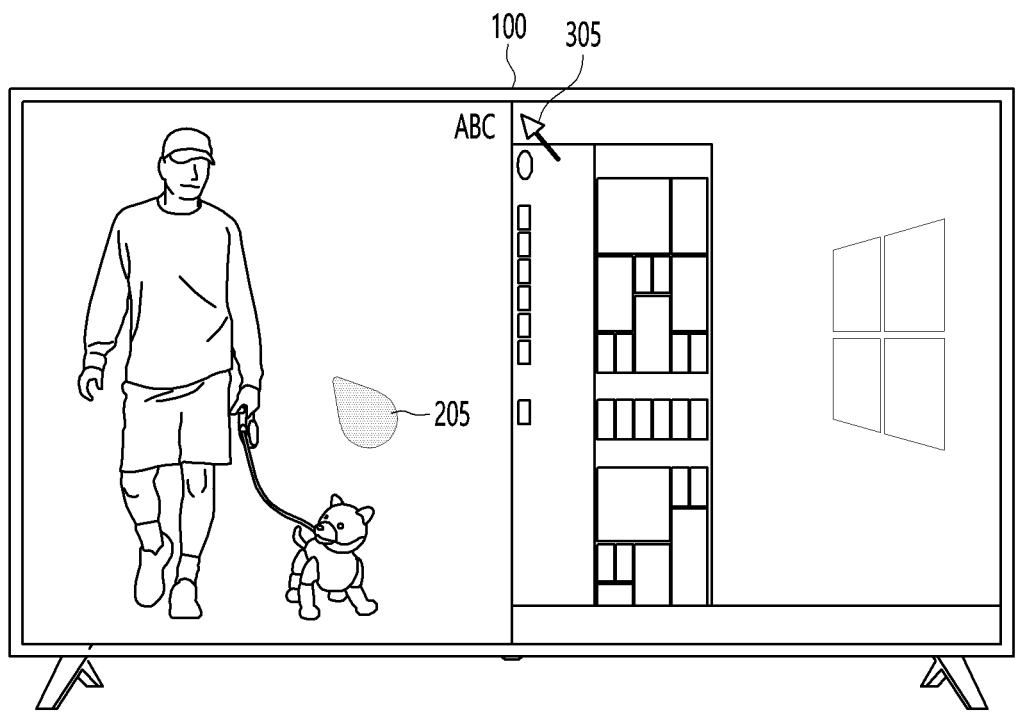
FIG. 11 is an exemplary view illustrating an operating method of a display device when a pointer of a remote control device is not located on a screen of an external device, according to an embodiment of the present disclosure.

FIG. 11 is an exemplary view illustrating the operating method of the display device when the pointer of the remote control device is not located on the screen of the external device, according to an embodiment of the present disclosure.

As described above, the display device 100 may display other content on a portion where the screen of the external device 300 is not displayed.

When the pointer 205 of the remote control device 200 is not located on the screen of the external device 300 as illustrated in FIG. 11, the display device 100 may operate in the first mode.

The first mode may be a mode in which the pointer 205 of the remote control device 200 is opaquely displayed on the display 180, or the pointer 205 is not displayed when there is no user input.

According to an embodiment, the display 180 may display the pointer 205 opaquely in the first mode.

According to another embodiment, the display device 100 may display the pointer 205 opaquely in the first mode, but may or may not display the pointer 205 according to whether there is an input from the remote control device 200. For example, if there is no input from the remote control device 200 when the display 180 is displaying a broadcast screen, the display 180 may not display the pointer 205 and may display the pointer 205 until the control signal is input from the user input interface 230 or a few seconds elapse after the input of the control signal.

Meanwhile, according to an embodiment, when the Miracast is connected, the controller 170 may control the shape of the pointer 205 differently from the shape of the pointer 205 when the Miracast is not connected. For example, when the Miracast is connected as illustrated in FIG. 11 but the position of the pointer 205 is not located on the screen of the external device 300, the controller 170 may display the shape of the pointer 205 differently from the shape of the pointer 205 when the Miracast is not connected.

Through this difference in shape, when the user moves the position of the pointer 205 onto the screen of the external device 300, the user can recognize that the external device 300 can be controlled again.

Referring back to FIG. 10, when it is determined that the pointer 205 of the remote control device 200 is located on the screen of the external device 300, the display device 100 may operate in the second mode (S107) or the third mode according to whether the external device 300 can be controlled by the remote control device 200 (S108).

A method in which the display device 100 according to the embodiment of the present disclosure operates in the second mode when the external device 300 can be controlled through the remote control device 200 and the pointer 205 is located on the screen of the external device 300 will be described with reference to FIG. 12.

Figure 12:
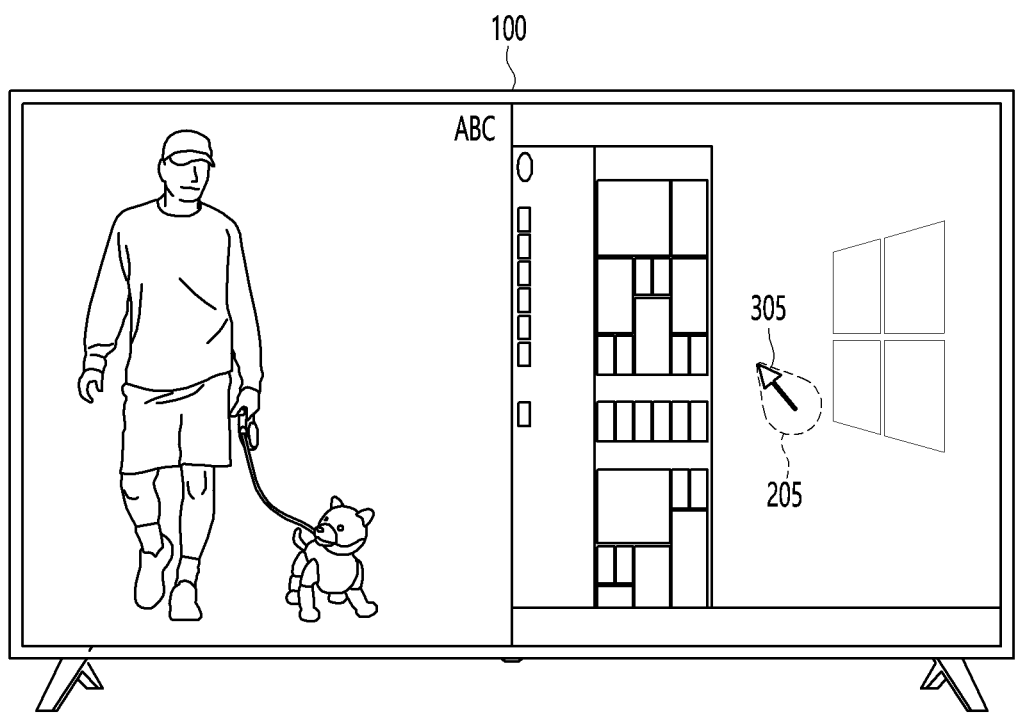
FIG. 12 is an exemplary view illustrating a screen of a display device according to whether control is possible when a pointer is located on a screen of an external device, according to an embodiment of the present disclosure.

FIG. 12 is an exemplary view illustrating the screen of the display device according to whether control is possible when the pointer is located on the screen of the external device, according to an embodiment of the present disclosure.

When the pointer 205 of the remote control device 200 is located on the screen of the external device 300 and the external device 300 can be controlled through the remote control device 200, the controller 170 may control the display 180 to operate in the second mode in which the pointer 205 is transparently displayed as illustrated in FIG. 12.

Next, a method in which the display device 100 according to the embodiment of the present disclosure operates in the third mode when the external device 300 cannot be controlled through the remote control device 200 and the pointer 205 is located on the screen of the external device 300 will be described with reference to FIG. 13.

Figure 13:
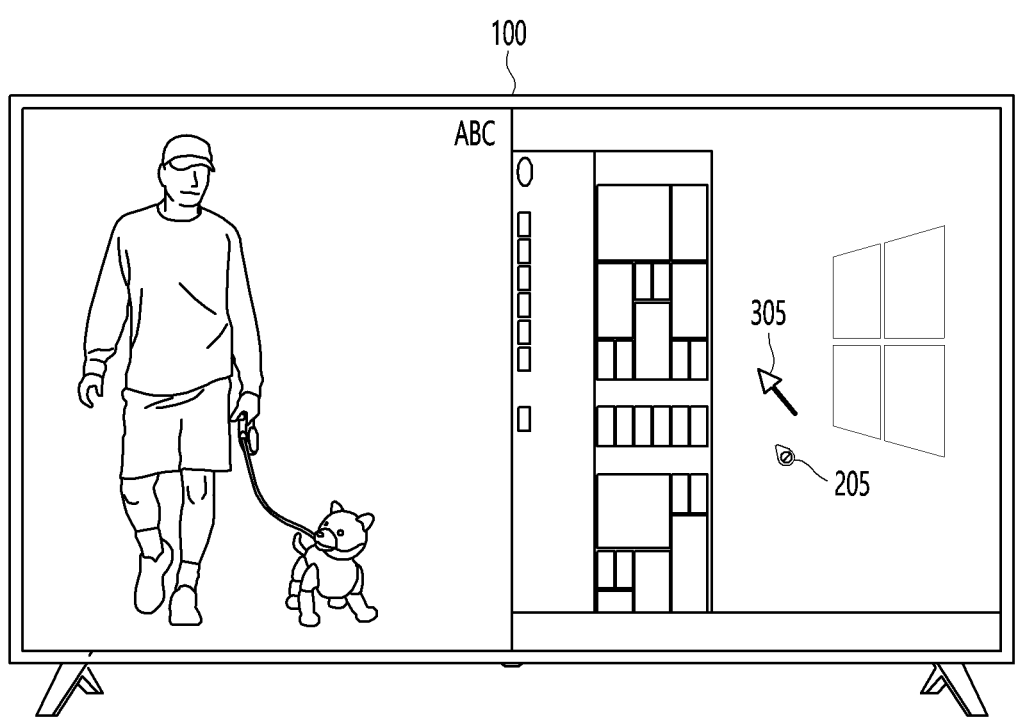
FIG. 13 is an exemplary view illustrating a screen of a display device according to whether control is possible when a pointer is located on a screen of an external device, according to an embodiment of the present disclosure.

FIG. 13 is an exemplary view illustrating the screen of the display device according to whether control is possible when the pointer is located on the screen of the external device, according to an embodiment of the present disclosure.

When the pointer 205 of the remote control device 200 is located on the screen of the external device 300 and the external device 300 cannot be controlled through the remote control device 200, the controller 170 may control the display 180 to operate in the third mode in which the shape of the pointer 205 is differently displayed as illustrated in FIG. 13.

According to the present disclosure, the pointer display mode of the display device is changed while displaying the screen of the external device, thereby minimizing user confusion caused by the delay in the data transmission or reception process.

According to the present disclosure, when the control of the external device is impossible, the shape of the pointer is changed and displayed, thereby enabling the user to immediately recognize that the control of the external device is impossible.

According to the present disclosure, the pointer display mode is changed according to the current position of the pointer, thereby increasing the convenience of Miracast.

The present disclosure may be embodied as computer-readable codes on a program-recorded medium. The computer-readable recording medium may be any recording medium that stores data which can be thereafter read by a computer system. Examples of the computer-readable medium may include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer may include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

Each of the embodiments disclosed in this specification may be implemented alone, or in combination with other embodiments.

The scope of protection of the present disclosure should be interpreted by the appending claims, and all technical ideas within the scope of equivalents should be construed as falling within the scope of the present disclosure.

What is claimed is:

1. A display device comprising:
a user input interface configured to receive a signal from a remote control device associated with the display device;
a wireless communication interface configured to receive control data and image data from an external device;
a display; and
a controller configured to cause the display to display an external device screen based on the received image data, wherein the displayed external device screen is the same as a screen being displayed on the external device; and
control a display state of a pointer of the remote control device and a display state of a cursor of the external device based on a set pointer display mode among a plurality of pointer display modes,
wherein the pointer display mode for controlling the display state of the pointer of the remote control device and the display state for the cursor of the external device is set based on an indicator included in the control data received from the external device, wherein the indicator indicates whether the external device is able to be controlled by the remote control device.

2. The display device according to claim 1, wherein the controller is configured to control the display to operate in the set pointer display mode in which the pointer of the remote control device is transparently displayed based on the control data indicating that the external device is able be controlled by the remote control device.

3. The display device according to claim 1, wherein the controller is configured to control the display to operate in the set pointer display mode in which the pointer of the remote control device is transparently displayed based on the cursor of the external device being included in the displayed external device screen and the external device being able to be controlled by the remote control device.

4. The display device according to claim 1, wherein a shape of the pointer of the remote control device is displayed differently based on whether the external device is able to be controlled by the remote control device.

5. The display device according to claim 1, wherein a display transparency of the pointer of the remote control device is higher based on the external device being able to be controlled by the remote control device than when the external device is not able to be controlled by the remote control device.

6. The display device according to claim 1, wherein the pointer display mode is changed according to a position of the pointer of the remote control device.

7. The display device according to claim 6, wherein the controller is configured to control the display to operate in the set pointer display mode in which the pointer of the remote control device is transparently displayed based on the pointer being located on the displayed external device screen.

8. The display device according to claim 7, wherein the pointer of the remote control device is displayed with higher transparency when the pointer is located on the displayed external device screen than when the pointer is located outside of the displayed external device screen.

9. The display device according to claim 6, wherein the plurality of pointer display modes comprise:
a first mode when the pointer is located outside of the displayed external device screen;

a second mode when the pointer is located on the displayed external device screen and the external device is able to be controlled by the remote control device; and a third mode when the pointer is located on the displayed external device screen and the external device is not able to be controlled by the remote control device.

10. A method of operating a display device, the method comprising:

receiving control data and image data from an external device;

displaying an external device screen based on the received image data, wherein the displayed external device screen is the same as a screen being displayed on the external device; and controlling a display state of a pointer to of the remote control device and a display state of a cursor of the external device based on a set pointer display mode among a plurality of pointer display modes, wherein the pointer display mode for controlling the display state of the pointer of the remote control device and the display state for the cursor of the external device is set based on an indicator included in the control data received from the externally device, wherein the indicator indicates whether the external device is able to be controlled by the remote control device.

11. The method of claim 10, further comprising:

performing control to operate in the set pointer display mode in which the pointer of the remote control device is transparently displayed based on the control data indicating that the external device is able be controlled by the remote control device.

12. The method of claim 10, further comprising:

performing control to operate in the set pointer display mode in which the pointer of the remote control device is transparently displayed based on the cursor of the external device being included in the displayed external device screen and the external device being able to be controlled by using the remote control device.

13. The method of claim 10, wherein:

a shape of the pointer of the remote control device is displayed differently based on whether the external device is able to be controlled by the remote control device.

14. The method of claim 10, wherein:

a display transparency of the pointer of the remote control device is higher based on the external device being able to be controlled by the remote control device than when the external device is not able to be controlled by the remote control device.

15. The method of claim 10, wherein the pointer display mode is changed according to a position of the pointer of the remote control device.

16. The method of claim 15, further comprising:

performing control to operate in the set pointer display mode in which the pointer of the remote control device is transparently displayed based on the pointer being located on the displayed external device screen.

17. The method of claim 16, wherein the pointer of the remote control device is displayed with higher transparency when the pointer is located on the displayed external device screen than when the pointer is located outside of the displayed external device screen.

18. The method of claim 15, wherein plurality of pointer display modes comprise:

a first mode when the pointer is located outside of the displayed external device screen;

a second mode when the pointer is located on the displayed external device screen and the external device is able to be controlled by the remote control device; and a third mode when the pointer is located on the displayed external device screen and the external device is not able to be controlled by the remote control device.

* * * * *